United States Patent [19]
James et al.

[11] Patent Number: 5,899,544
[45] Date of Patent: May 4, 1999

[54] SECURE STOWAGE SYSTEM

[75] Inventors: John I. James; D. Brett Honeycutt; David R. Deitrick, all of Knoxville; Randal H. Pierce, Maryville, all of Tenn.

[73] Assignee: Cube-IV, L.L.C., Tenn.

[21] Appl. No.: 08/837,590

[22] Filed: Apr. 21, 1997

[51] Int. Cl.$^6$ ..................................................... A47B 53/00
[52] U.S. Cl. .................... 312/198; 108/110; 296/37.6; 410/141; 224/404
[58] Field of Search .......................... 410/141; 296/37.6; 224/404; 312/198, 201, 293.1, 293.2, 293.3, 348.3; 108/65, 110; 211/94.02, 201

[56] References Cited

U.S. PATENT DOCUMENTS

| | | |
|---|---|---|
| 1,830,347 | 11/1931 | Camden et al. . |
| 2,262,085 | 11/1941 | Allen . |
| 3,606,227 | 9/1971 | Klein ....................................... 108/110 |
| 4,433,804 | 2/1984 | Bott . |
| 4,772,165 | 9/1988 | Bartkus . |
| 4,943,194 | 7/1990 | Aguilar . |
| 5,036,778 | 8/1991 | Briosi ....................................... 108/110 |
| 5,037,153 | 8/1991 | Stark . |

*Primary Examiner*—Peter M. Cuomo
*Assistant Examiner*—Gerald A. Anderson
*Attorney, Agent, or Firm*—Luedeka, Neely & Graham, P.C.

[57] ABSTRACT

A secure stowage system having first and second support members. The second support member is releasably attached to a support system such that the second support member can only be removed from the support system by first moving the second support member according to a predetermined adjustment. The first and second support members have receiving means. A lockable item is configured to fit between the first and second support members. The lockable item has a lock and first and second mating means. The first mating means are adapted to engage the receiving means of one of the first and second support members. The second mating means are likewise adapted to engage the receiving means of the other of the first and second support members. The first mating means are selectively retractable toward the lockable item, but only when the lock is in an unlocked position. The first mating means are unretractable when the lock is in a locked position. The first and second mating means are configured to engage the receiving means of the first and second support members when the first and second mating means are in an extended position. When the lockable item is between the first and second support members and the first and second mating means are in an extended position, the lockable item cannot be removed from between the first and second support members without retracting the first mating means. Further, the one of the first and second mating means of the lockable item engaging the receiving means of the second support member prevents the second support member from moving according to the predetermined adjustment.

18 Claims, 10 Drawing Sheets

SECURE STOWAGE SYSTEM

FIELD OF THE INVENTION

This invention relates to the field of stowage systems. More particularly the invention relates to the field of portable, lockable stowage systems which can keep items secure without supervision.

BACKGROUND OF THE INVENTION

Stowage systems, such as those used in the back of pick-up trucks, are useful for those who wish to carry many relatively small items, such as tools. The stowage system tends to prevent the tools from sliding around in the back of the truck, which acts to protect not only the tools, but the bed of the truck as well. Further, because the stowage system typically hangs above the bed of the truck, it does not prevent all alternate beneficial use of the truck bed, such as loading flat objects like plywood and sheetrock beneath the stowage system.

The varying designs of stowage systems tend to emphasize either one of two different design considerations: portability or security. Those stowage systems which emphasize portability allow for removal of the bin or box which contains the tools from the truck. This can be done by making a simple release mechanism which attaches the bin to the truck. If attached in such a fashion, the bin can be relatively easily removed, either by the owner, or by anyone else who desires to remove the tool box, such as a thief. Thus, such a system generally lacks much in the way of security. However, in addition to the portability afforded by such a stowage system, the portable design systems also allow the bed of the truck to be used in other ways, as the stowage system may be relatively easily removed from the truck.

Those stowage systems which emphasize security in their design typically do not provide any practical method for removing the box from the truck. The box can be bolted or otherwise securely attached to the truck, and the operative ends of such attachments can be located in relatively inaccessible positions, such as inside of the box itself, or inside the body of the truck. These boxes tend to have no practical method for their removal short of completely disassembling the stowage system in the same manner in which it was attached to the truck. Thus, while these systems tend to be quite secure, they do not provide the convenience of portability afforded by the portable design systems. Additionally, the secure design systems tend to restrict the use of the bed of the truck, as the stowage system cannot be readily removed to allow something else to be placed in the bed of the truck, such as a full load of sand or large items.

Both systems tend to suffer from an inability to adapt to different uses of the bed of the truck. For example, the portable design stowage systems tend to have the tool box in the same location whenever it is attached to the bed of the truck. The secure design systems provide very little convenient ability to place the tool box in more than one location. Thus, while having the tool box directly behind the cab of the truck may be the most convenient location for the tool box when the stowage system is installed, it may be more convenient at a later point in time to have the tool box located adjacent the tail gate, or along one side of the truck.

What is needed, therefore, is a stowage system that is readily removable from the bed of the truck, thus allowing for portability of the bin and enhanced use of the truck, and which provides a sufficient level of security to the items which are stored within the bins of the system, yet also allows for convenience placement of the bin in different locations in the bed of the truck.

SUMMARY OF THE INVENTION

The above and other needs are provided by a secure stowage system having a support system having receiving means, and support members, spaced a first distance apart from each other, have mating means releasably engaged with the receiving means of the support system. An item, such as a lockable item described below, is disposed between the support members. The item has a length substantially equal to the first distance, and fits between the support members such that the receiving means of the support system and the mating means of the support members cannot disengage without removing the item from between the support members. In a most preferred embodiment, the support members have receiving means releasably engaged with mating means of the item.

In yet another embodiment of a secure stowage system, first and second support members are provided. The second support member is releasably attached to a support system such that the second support member can only be removed from the support system by first moving the second support member according to a predetermined adjustment. The first and second support members have receiving means.

A lockable item is configured to fit between the first and second support members. The lockable item has a lock and first and second mating means. The first mating means are adapted to engage the receiving means of one of the first and second support members. The second mating means are likewise adapted to engage the receiving means of the other of the first and second support members. The first mating means are selectively retractable toward the lockable item, but only when the lock is in an unlocked position. The first mating means are unretractable when the lock is in a locked position.

The first and second mating means are configured to engage the receiving means of the first and second support members when the first and second mating means are in an extended position. When the lockable item is between the first and second support members and the first and second mating means are in an extended position, the lockable item cannot be removed from between the first and second support members without retracting the first mating means. Further, the one of the first and second mating means of the lockable item engaging the receiving means of the second support member prevents the second support member from moving according to the predetermined adjustment.

Thus, the lockable item fits securely between the first and second support members. The mating means of the lockable item are engaged with the receiving means of the support members. The mating means of the lockable item cannot be retracted unless the lock of the lockable item is in an unlocked position. Further, the second support member cannot be removed from the support system while the mating means and the receiving means are engaged. Thus, in this configuration, the lockable item is secure in the stowage system. However, moving the lock into an unlocked position allows the mating means to be selectively retracted, which allows the lockable item to be removed. In addition the second support member can now be moved according to the predetermined adjustment, and removed. Therefore, not only is the lockable item removable and portable, but the stowage system may be reassembled with at least the lockable item, and even the second support member in a different location, providing adaptability to the stowage system, in that the lockable item may be placed in any one of several different locations within the boundaries of the support system.

In preferred embodiments the predetermined adjustment can be either rotating the second support member, or moving the second support member toward the first support member. The second support member may be releasably attached to the support system at either one or both ends of the second support member. The first support member can also be releasably attached to the support system such that it too can only be removed from the support system by first moving the second support member according to the predetermined adjustment. The first and second support members are preferably rigid bars and the receiving means are slots, such as slotted rails, and the first and second mating means may be lugs, which engage the slots. The first and second support members may have adjustable lengths, and have horizontal elements such that the lockable item can rest on the horizontal elements between the first and second support members when the first mating means are retracted.

In alternate embodiments the lockable item may be a bin, such as a tool box. The second mating means, in addition to the first mating means, may also be selectively retractable toward the lockable item, again only when the lock is in an unlocked position, and being unretractable when the lock is in a locked position. However, in an especially preferred embodiment, the lock has an intermediate position in which an adjustment may be made to the lockable item, but the first mating means (and second mating means if so configured) still cannot be retracted. With the lock in this position, the box may be opened, but the mating means may not be retracted.

BRIEF DESCRIPTION OF THE DRAWINGS

Further advantages of the invention will become apparent by reference to the detailed description of preferred embodiments when considered in conjunction with the following drawings, which are not to scale, in which like reference numerals denote like elements throughout the several views, and wherein.

DETAILED DESCRIPTION OF THE INVENTION

Figure 1:
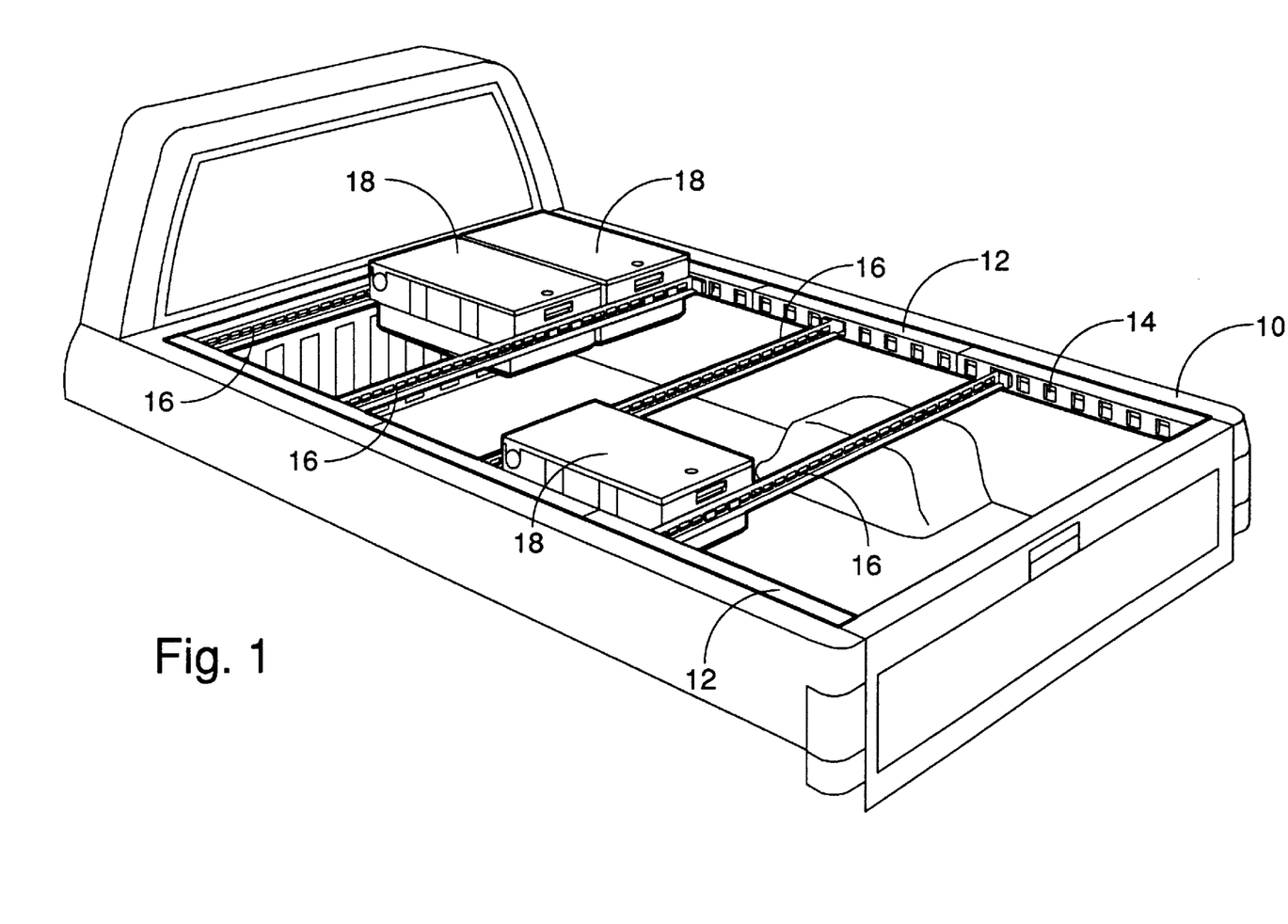
FIG. 1 depicts a first embodiment of the invention as adapted to a truck.

Referring now to the drawings, there is depicted in FIG. 1 a first embodiment of the invention as adapted to fit within the bed of a pick-up truck 10. While the invention as particularly described herein is done so with reference to a truck 10, it will be appreciated that the invention is equally applicable to other embodiments, such as atop a car, integrated into a rack, or mounted inside a cabinet or storage area.

As can be seen in FIG. 1, support system 12 is affixed within the bed of the truck 10. In the example depicted, support system 12 has rails with slots 14. The rails may be a single piece of material extending down each of the two sides of the truck 10, or they may be segmented and extend only down a portion of the length of the sides of the truck 10. Additionally, the support system 12 may be mounted on top of the sides of the truck 10, rather than just inside of the bed of the truck 10, or they may be mounted at the bottom of the bed of the truck 10.

Support members 16, such as the cross-pieces depicted in FIG. 1, releasably attach to the support system 12, such as by fitting within the slots 14 provided in the support system 12. Once two support members 16 are in place, a lockable item 18, such as the toolbox depicted, fits between the two support members 16. In FIG. 1, four support members 16 are depicted, and three lockable items 18 are positioned between the support members 16.

The lockable items 18 have lugs which fit within slots in the support members 16, both of which are more particularly described hereafter. The lugs retain the lockable item 18 between the support members 16. The lockable item 18 between the support members 16 prevents the support members 16 from disengaging the slots 14 in the support system 12, also as described more fully below.

Figure 2:
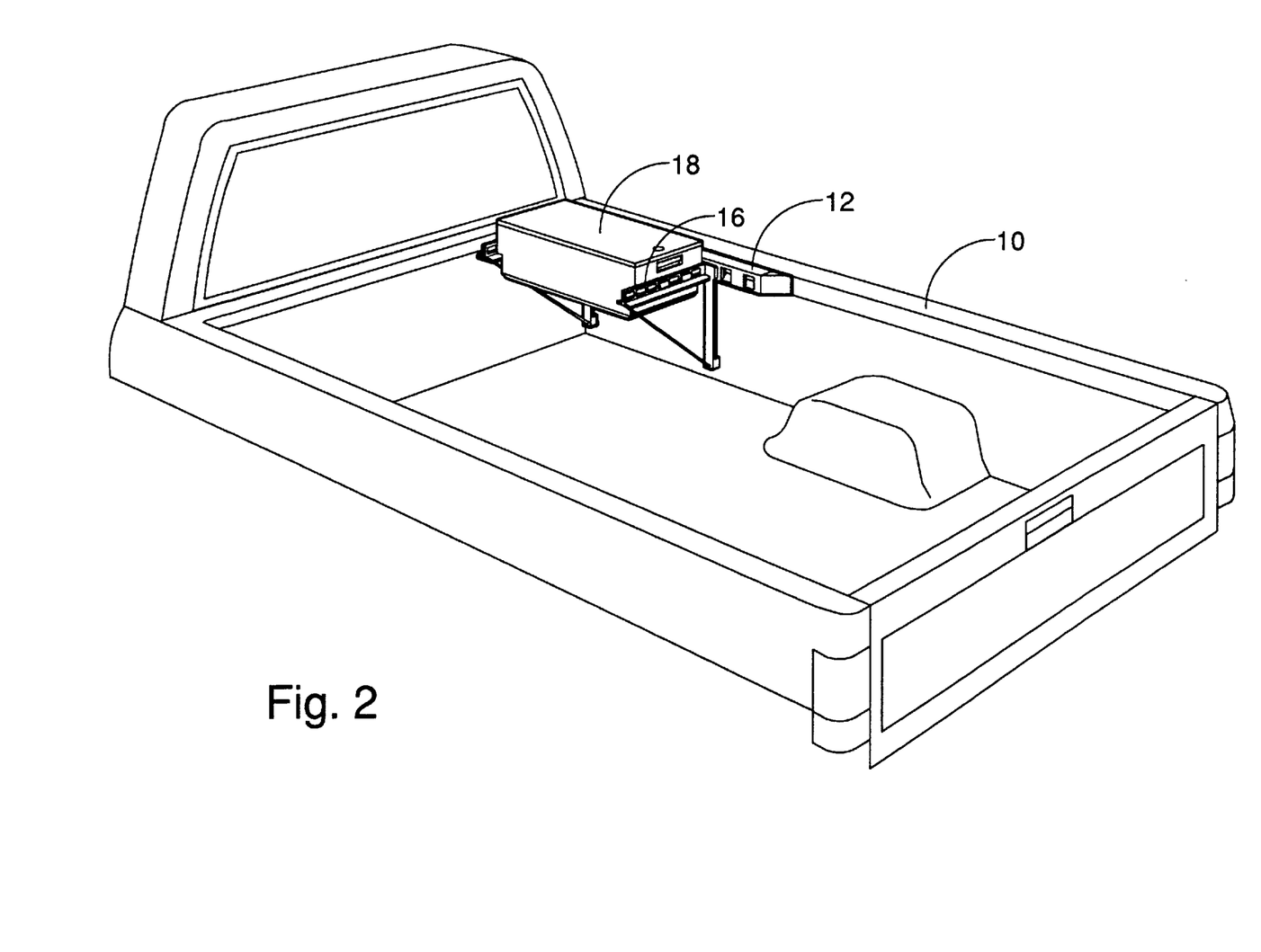
FIG. 2 depicts a second embodiment of the invention as adapted to a truck.
Figure 3:
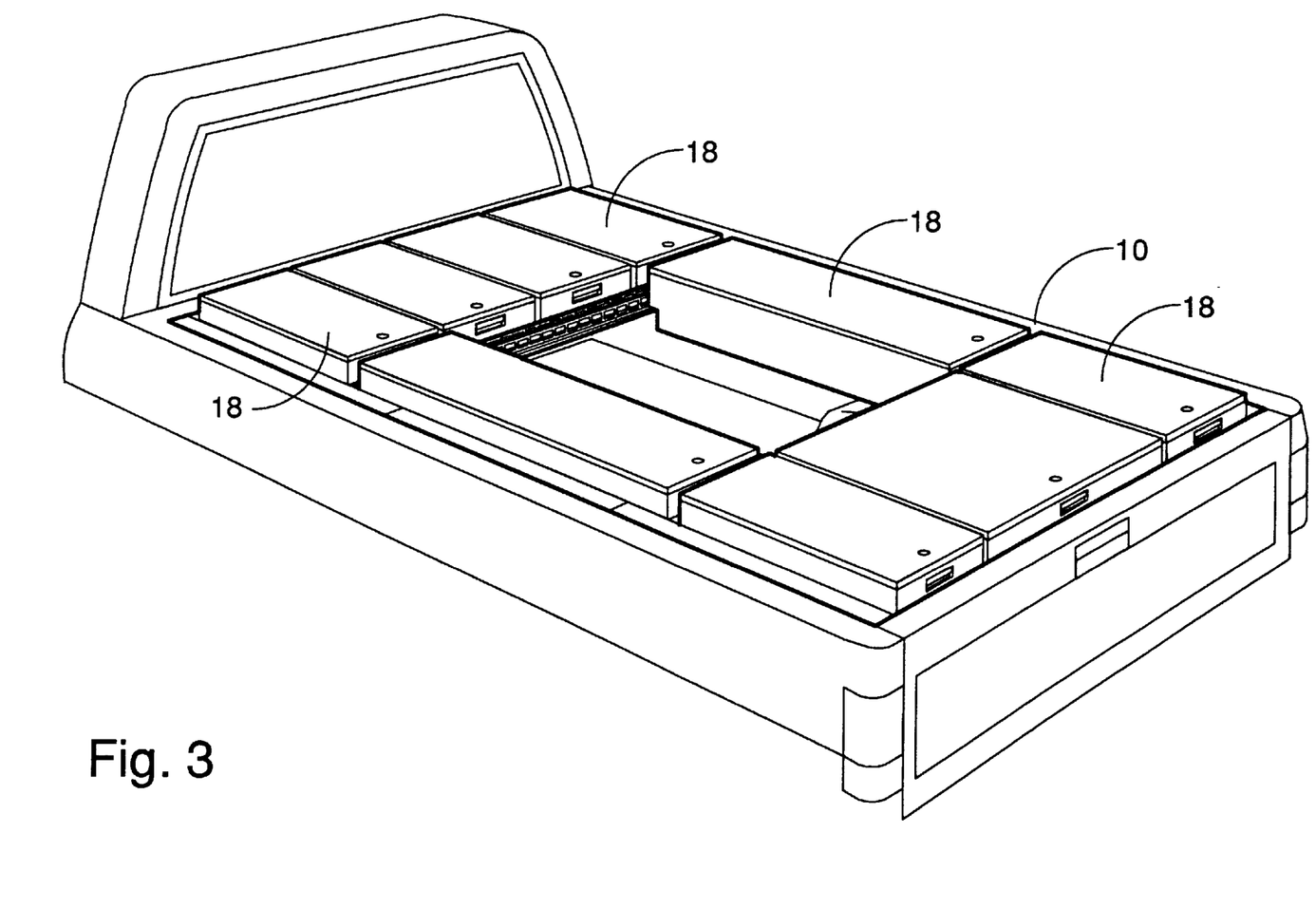
FIG. 3 depicts a third embodiment of the invention as adapted to a truck.

FIG. 2 depicts an alternate embodiment where the support system 12 is located on only one side of the truck 10, and does not extend down the entire length of the bed of the truck 10, and in which the support members 16 do not extend completely across the bed of the truck 10, and are only attached to the support system 12 at one end. In the example depicted, there is one lockable item 18 placed between the two support members 16. The rigidity of the support members 16 keeps the lockable item 18 secure, and prevents it from coming loose between the support members 16. In the example depicted in FIG. 3, the support system 12 extends the entire length of the bed of the truck 10, and several lockable items 18, depicted as bins, are placed between the support members 16. Another aspect of this embodiment is that one or more of the support members 16, such as the one just behind the cab of the truck 10, may be immovably attached to the support system 12, and the rest of the support members 16 are releasably attached to the support system 12.

Figure 4A:
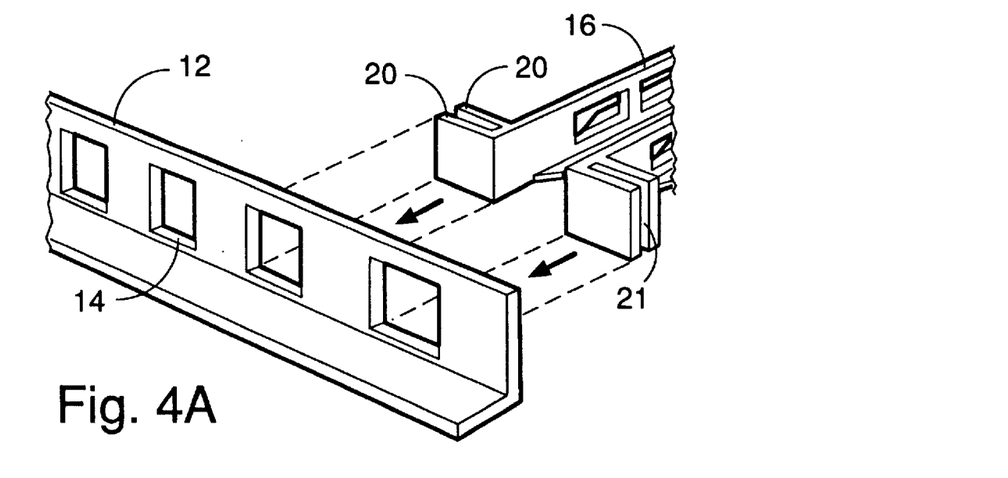
FIGS. 4A–4C depict a first embodiment of the predetermined adjustment.
Figure 4B:
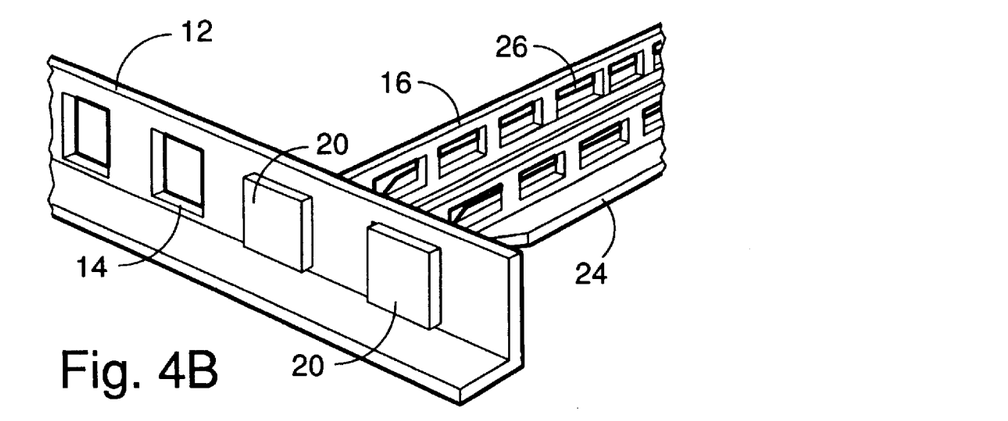
Figure 4C:
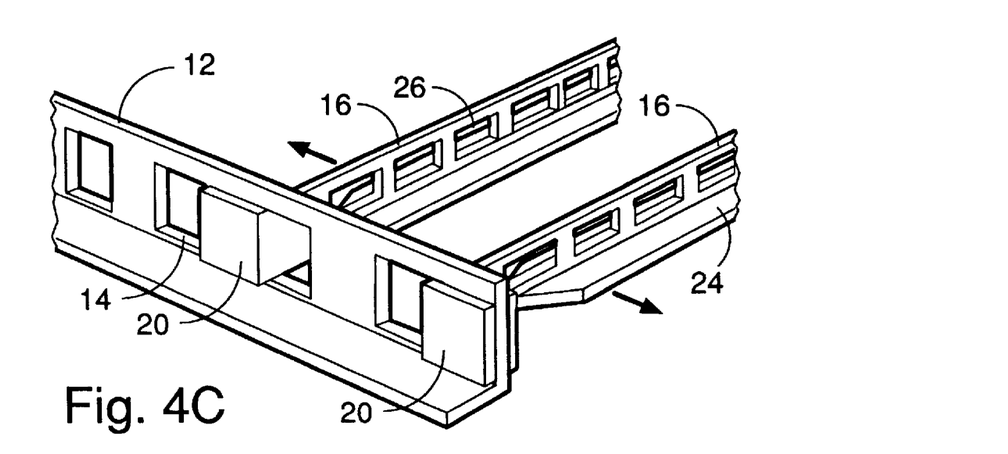

FIGS. 4A–4C depict in more detail one embodiment of how the support members 16 are releasably attached to the support system 12. In the example depicted in FIG. 4A, the support members 16 have tabs 20 at the end, substantially corresponding in size to the slots 14 in the support system 12. The support members 16 are brought in contact with the support system 12 such that the tabs 20 fit into the slots 14, as depicted in FIG. 4B. Finally, the support members 16 are then moved away from each other, so that the gap 21 defined by the tabs 20 at the end of the support members 16 engage a portion of the support system 12, as depicted in FIG. 4C. The tabs 20, thus releasably attached to the support system 12, prevent the support members 16 from being removed from the support system 12.

The support members 16 may be removed from the support system 12 by moving them according to a predetermined adjustment, which in the example depicted is the opposite of that used to attach the support members 16 to the support system 12, that is, by sliding them toward each other, and then pulling the tabs 20 out of the slots 14. As depicted, the support members 16 cannot be readily removed from the support system 12 until this predetermined adjustment to the support members 16 has been made. Preventing this predetermined adjustment would tend to prevent the support members 16 from being removed from the support system 12.

Figure 5A:
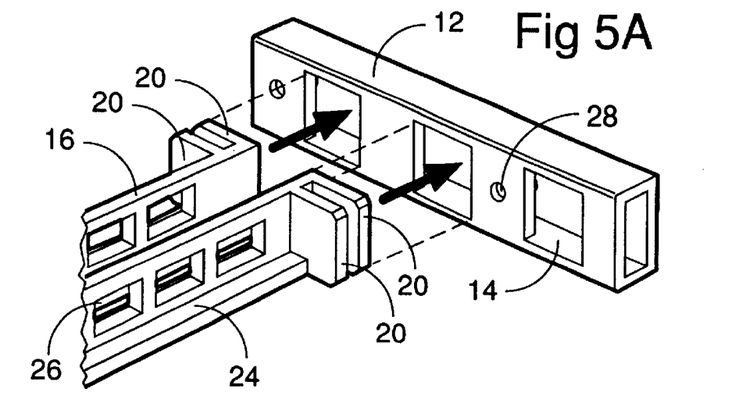
FIGS. 5A–5C depict additional features of the first embodiment of the predetermined adjustment.
Figure 5B:
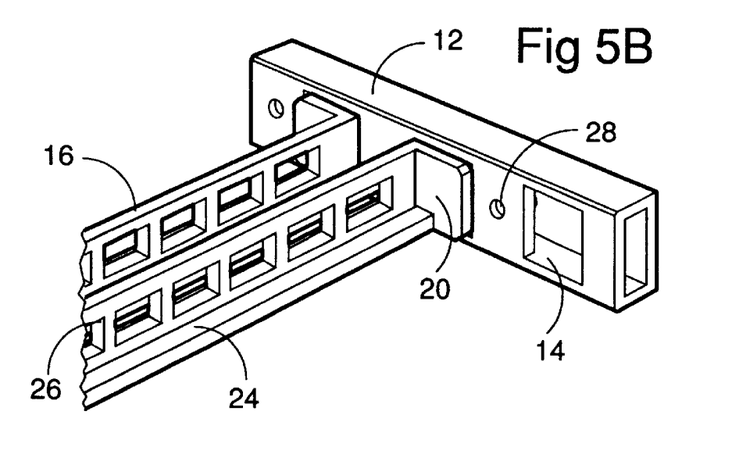
Figure 5C:
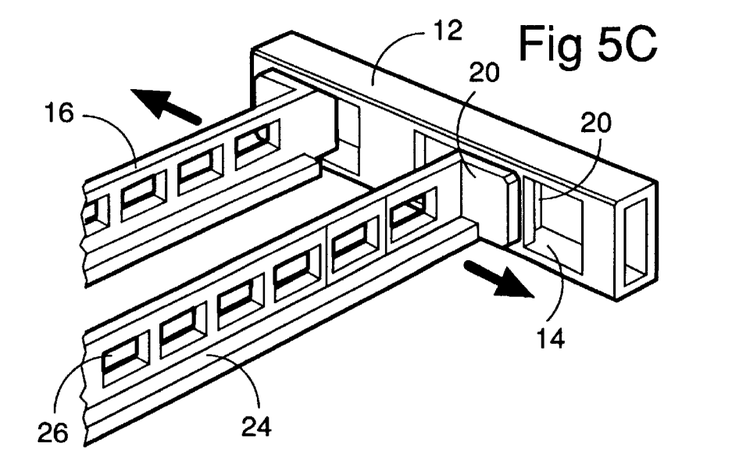

FIGS. 5A–5C depict the support members 16 being releasably attached to the support system 12 from a different view. In this view an access hole 28 is visible. A bolt, screw, or other fastener could be inserted through access hole 28 to attach the support system 12 to the truck 10. As can be seen in FIG. 5C, once the support members 16 have been moved into position with the tabs 20 engaging the support system 12, the access hole 28 is blocked by the tab 20, and whatever fastener has been inserted through the access hole 28 is no longer accessible. Thus, this method may be used to provide a secure mechanism for keeping the support system 12 attached to the truck 10 when the stowage system is in use.

Figure 6A:
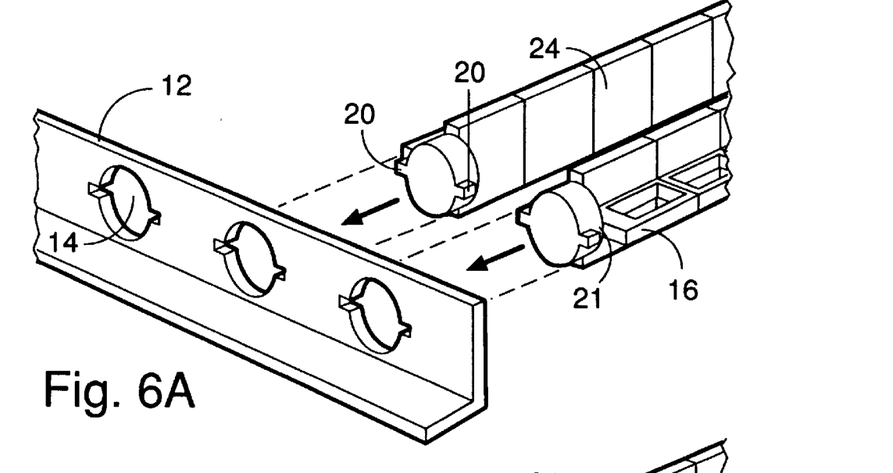
FIGS. 6A–6C depict a second embodiment of the predetermined adjustment.
Figure 6B:
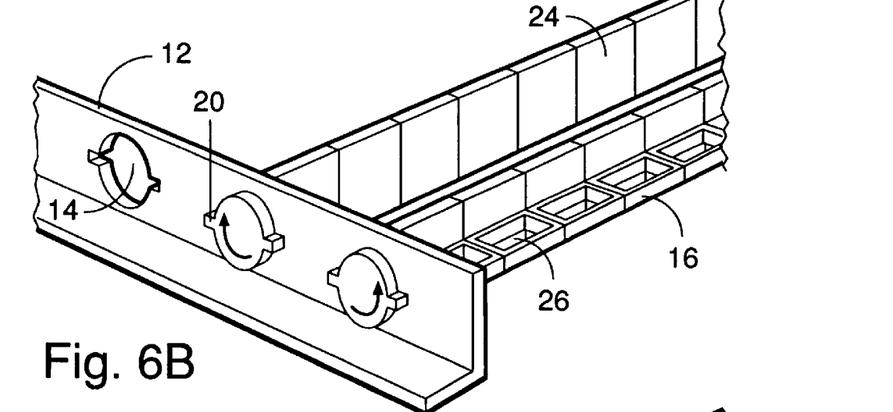
Figure 6C:
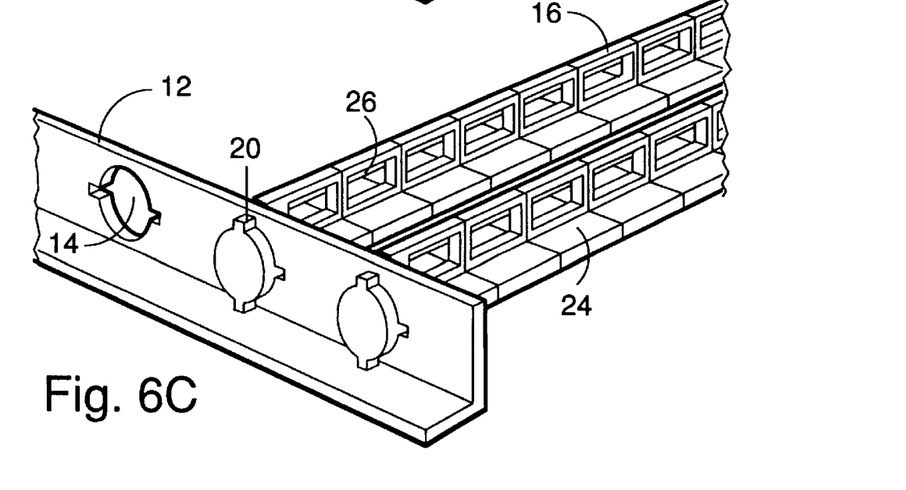

FIGS. 6A–6C depict an alternate embodiment of the support members 16, tabs 20, and slots 14, in which the tabs 20 are inserted into the slots 14, and the support members 16 are then rotated, which causes the gap 21 between the tabs 20 to engage a portion of the support system 12. In this embodiment, the predetermined adjustment which must be made to the support members 16 in order to remove them from the support system 12 is rotating the support members 16. As previously mentioned, preventing the support members 16 of this embodiment from rotating in this manner, would tend to prevent the support members 16 from being removed from the support system 12.

Figure 7A:
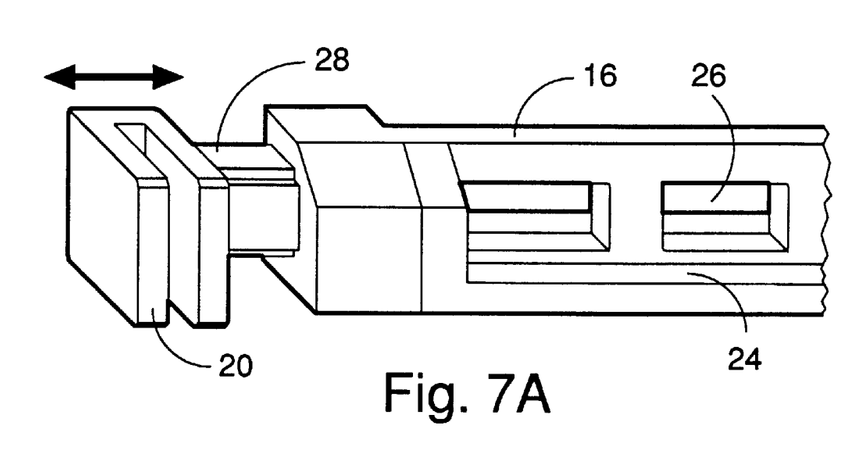
FIGS. 7A–7B depict different embodiments of the extension of the support members.
Figure 7B:
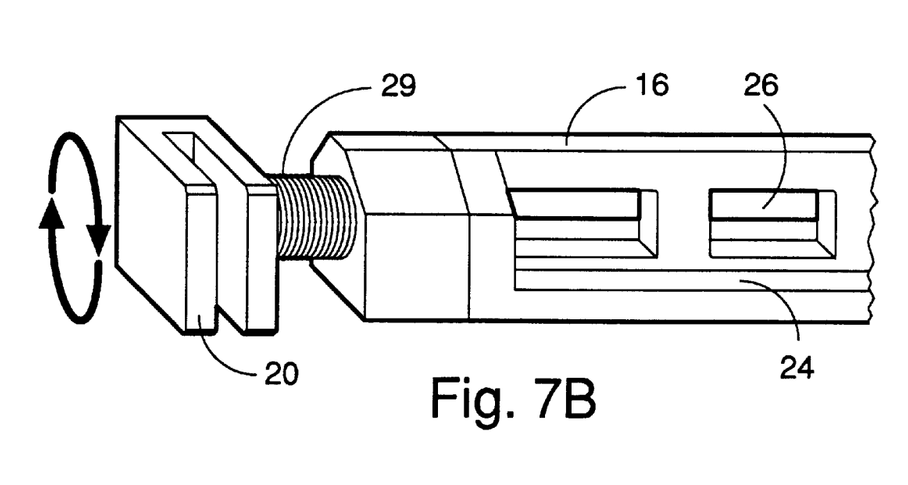

FIGS. 7A and 7B depict two ways in which the support members 16 may be extended and compressed to fit the varying widths of different trucks 10. As seen in FIG. 7A, a sliding section 28 may be placed between the tab 20 and the rest of the support member 16. The sliding section 28 can slide in and out, thus extending and reducing the overall length of the support member 16. In an alternate embodiment depicted in FIG. 7B, a screw section 29 is placed between the tab 20 and the rest of the support member 16. The screw section 29 can be rotated such that the tab 20 can be brought closer into the support member 16, or extended away from the support member 16, thus extending and compressing the overall length of the support member 16.

Figure 8:
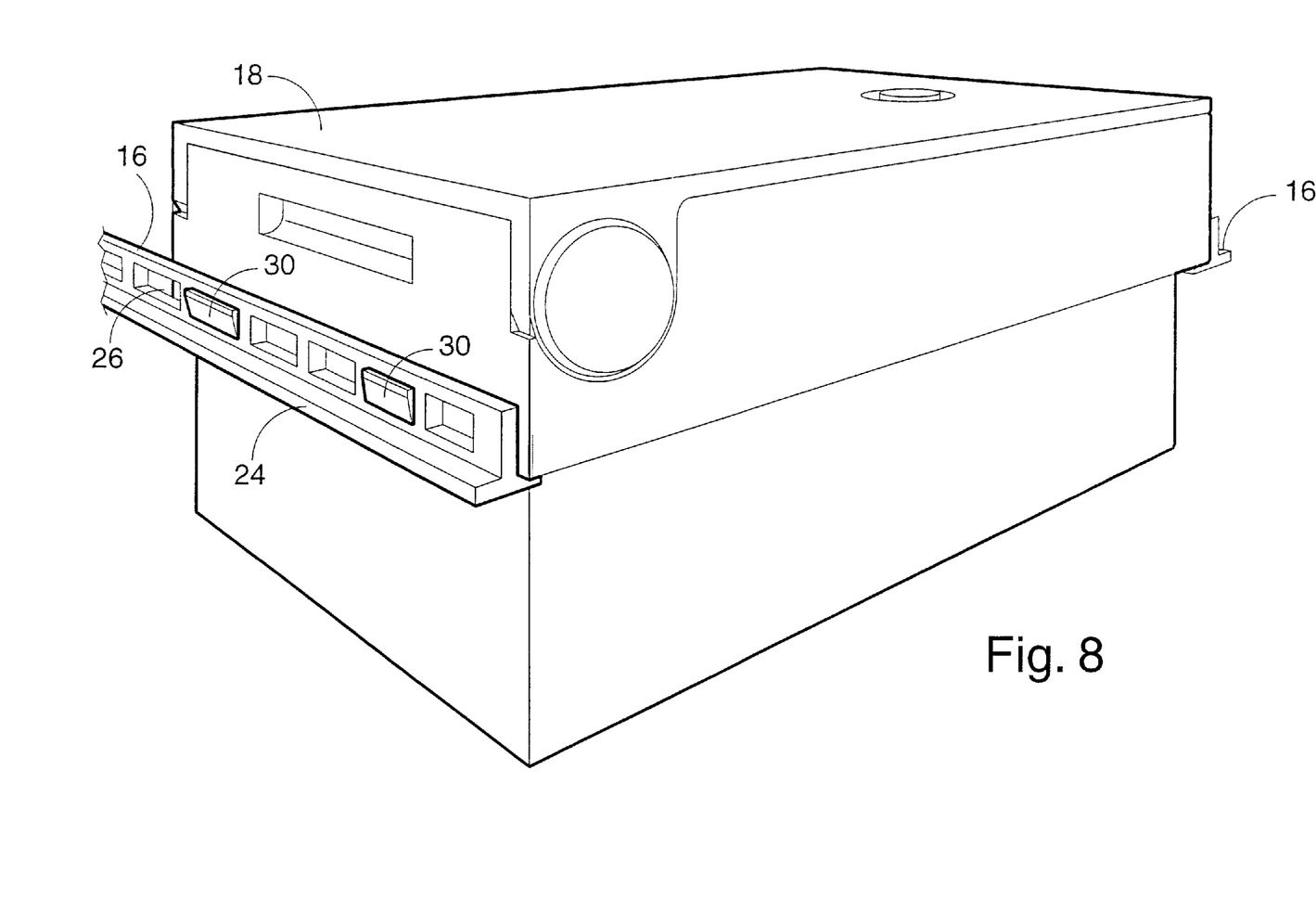
FIG. 8 depicts an embodiment of the mating means on a lockable item engaging the receiving means of a support member.

FIG. 8 depicts a lockable item 18, which is again a toolbox in this example. The lockable item 18 has two sets of mating means 30, only one of which two sets is depicted in FIG. 8. The mating means 30 engage the receiving means 26 of the support members 16. In the example depicted, this is implemented by lugs 30 fitting into slots 26. The mating means 30 on at least one end of the lockable item 18 are selectively retractable, which allows the lockable item 18 to be placed between a first and a second support member 16 which are preferably spaced a first distance apart, just far enough apart for the lockable item 18, which preferably has a length substantially equal to the first distance, to be placed between them. Then, when the selectively retractable mating means 30 are extended, and engage the receiving means 26 of the support member 16, the lockable item 18 cannot be removed from between the first and second support members 16 until the mating means 30 are again retracted.

As depicted in FIGS. 5, 6, 7, and 8, the support members 16 preferably have a horizontal element 24 on which the lockable item 18 can rest. This provides a mechanism for the lockable item 18 to be correctly placed between the support members 16 so that the mating means 30 may be more easily extended and engaged with the receiving means 26 of the support members 16. In addition, the horizontal elements 24 of the support members 16 depicted in FIGS. 6A–6C, with the lockable item 18 resting upon them, tend to prevent the support members 16 from moving according to the predetermined adjustment, which is a rotation. In one embodiment, the support member 16 has an upside-down T-shaped cross-section, such as can be generally seen in FIG. 8, where the cross-piece of the T provides the horizontal elements 24 on either side of a vertical piece, in which the slots 14 are provided.

Figure 9:
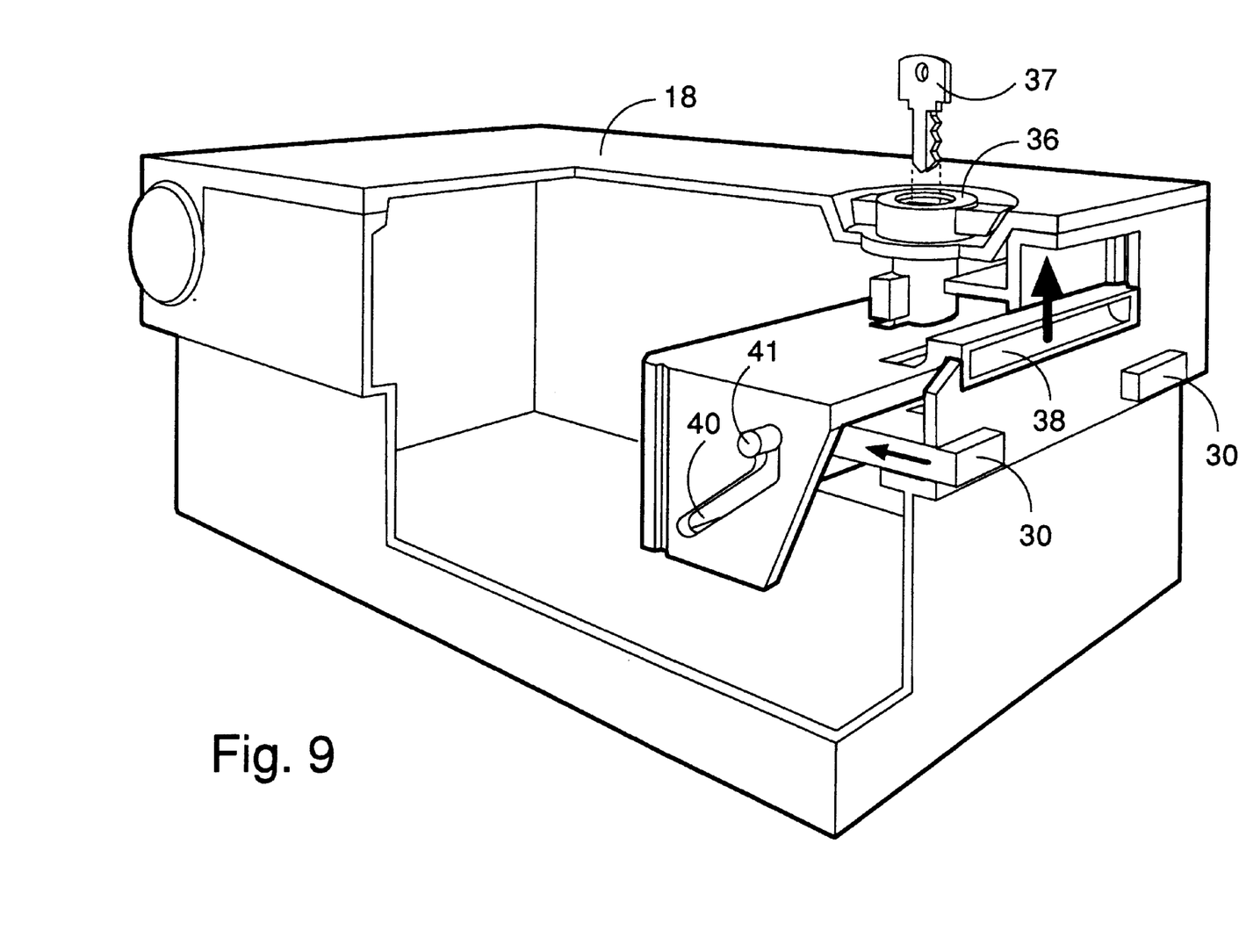
FIG. 9 depicts an embodiment of the selectively retractable mating means of a lockable item.

FIG. 9 depicts a little more information about one embodiment of the selectively retractable mating means 30. In this depiction, a portion of the lockable item 18 has been cut away so that the workings of the selectively retractable mating means 30 can be more easily seen. As shown in this embodiment, the lockable item 18 has a lock 36, into which a key 37 fits. In alternate embodiments the lock 36 may be of another type, such a combination lock, which does not require a key 37. The operation of the lock 36 enables the operation of the selectively retractable mating means 30.

When the lock 36 is in a locked position, the handle 38 cannot be raised within the lockable item 18, and the mating means 30 preferably remain in an extended position. When the lock 36 is in an unlocked position, the handle 38 can be raised within the lockable item 18, which causes slot 40, attached to the handle 38, to move relative to pin 41, attached to the mating means 30. As the handle 38 moves up, the slot 40 tends to move the pin 41 back along the path of the slot 40, retracting the mating means 30 toward and into the lockable item 18. This retraction of the mating means 30 disengages the mating means 30 from the receiving means 26 of the support member 16, and allows the lockable item 18 to be removed from between the support members 16.

Thus, in a preferred embodiment, as long as the lock 36 is in a locked position, the selectively retractable mating means 30 cannot be disengaged from the receiving means 26 of the support member 16, and the lockable item cannot be removed, and is securely held between the support members 16, and within the support system 12. If the support system 12 is securely attached to the truck 10, then the lockable item 18 will also be securely attached, so to speak, to the truck 10. In an alternate embodiment, the mating means 30 on each end of the lockable item 18 are selectively retracted when the handle 38 moves up.

In alternate embodiments, the lock 36 also serves to lock and unlock an adjustment which may be made to the lockable item 18, such as locking and unlocking a lid on a toolbox, which may be opened and closed. In this embodiment, the lock 36 preferably has an intermediate position, in which the adjustment, such as opening and closing the lid, can be made, but the mating means 30 still cannot be retracted. This would allow free access to the contents of the toolbox 18, without allowing the entire toolbox 18 to be lifted out of the support members 16 and carried away.

In yet another embodiment, the lock 36 has an intermediate position which allows the mating means 30 to be retracted, so that the lockable item 18 can be removed from between the support members 16, but the adjustment, such as opening the lid of a toolbox, cannot be made until the lock 36 is in the fully unlocked position.

Figure 10A:
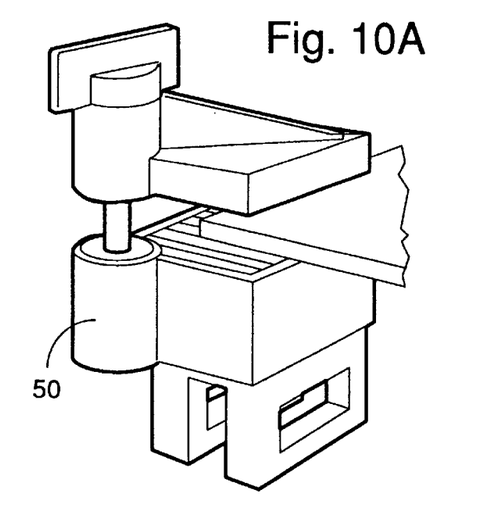
FIGS. 10A–10C depict embodiments of accessories.
Figure 10B:
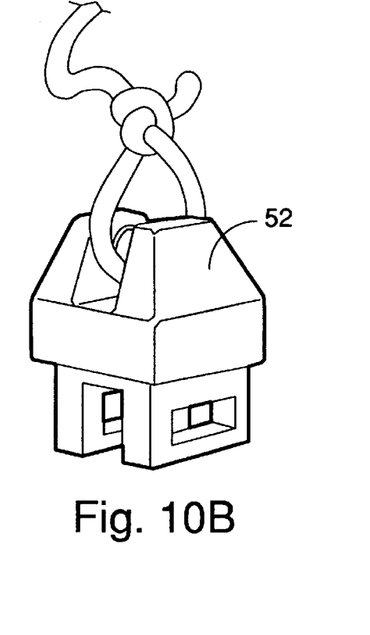
Figure 10C:
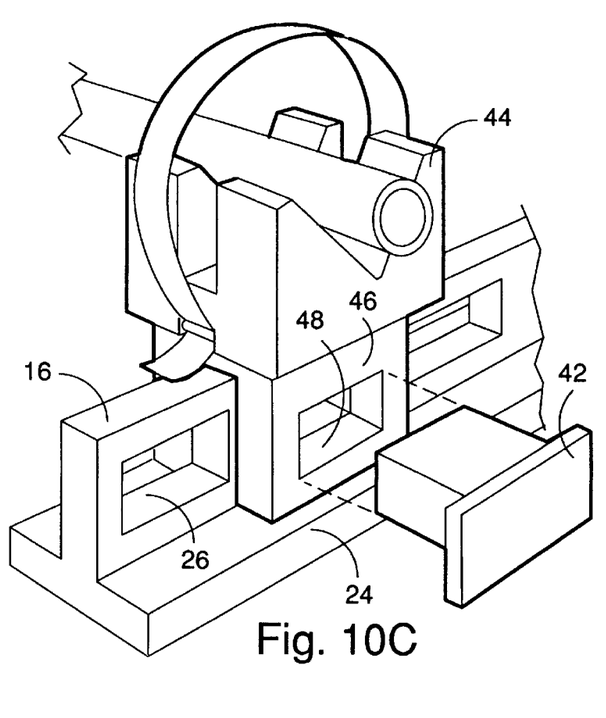

Other items, such as accessories, may be used in conjunction with the stowage system, such as a clamp 50, as depicted in FIG. 10A, a cinch block 52, as depicted in FIG. 10B, and a pipe vise 44, as depicted in FIG. 10C. These accessories may be attached to one or more of the support system 12 or the support members 16 of the stowage system, as exemplified in FIG. 10C. In the embodiment depicted, the accessory, in this case the pipe vise 44, has two spaced-apart tines 46, each with a slot 48. The tines 46 define a gap of about the same width as the thickness of the vertical portion of the support member 16. The slots 48 in the tines 46 of the pipe vise 44 are substantially the same size as, and align with the slots 26 of the support member 16. A tight-fitting pin 42 is then inserted through the slots 48 and the slot 26 therebetween, holding the pipe vise 44 in place on the support member 16. Of course, there are numerous other methods of holding such accessories in place on the stowage system.

While specific embodiments of the invention have been described with particularity above, it will be appreciated that the invention is adaptable to many other configurations well known to those skilled in the art.

What is claimed is:

1. A secure stowage system comprising:

first and second support members, the second support member releasably attached to a support system such that the second support member can only be removed from the support system by first moving the second support member according to a predetermined adjustment, the first and second support members having receiving means, a lockable item having a lock and first and second mating means, the first mating means adapted to engage the receiving means of one of the first and second support members and the second mating means adapted to engage the receiving means of the other of the first and second support members, the first mating means being selectively retractable toward the lockable item, the first mating means being retractable only when the lock is in an unlocked position, and the first mating means being unretractable when the lock is in a locked position, the first and second mating means configured to engage the receiving means of the first and second support members when the first and second mating means are in an extended position, the lockable item configured to fit between the first and second support members such that when the first and second mating means are in an extended position the lockable item cannot be removed from between the first and second support members without retracting the first mating means, and the lockable item configured to fit between the first and second support members such that the one of the first and second mating means of the lockable item engaging the receiving means of the second support member prevents the second support member from moving according to the predetermined adjustment.

2. The secure stowage system of claim 1 further comprising the first and second support members having horizontal elements such that the lockable item can rest on the horizontal elements between the first and second support members when the first mating means are retracted.

3. The secure stowage system of claim 1 further comprising accessories which attach to at least one of the first and second support members and the support system.

4. The secure stowage system of claim 1 wherein the predetermined adjustment further comprises rotating the second support member.

5. The secure stowage system of claim 1 wherein the predetermined adjustment further comprises moving the second support member toward the first support member.

6. The secure stowage system of claim 1 further comprising the first support member being releasably attached to the support system such that the first support member can only be removed from the support system by first moving the second support member according to a predetermined adjustment.

7. The secure stowage system of claim 1 wherein the first and second support members further comprise rigid bars.

8. The secure stowage system of claim 1 wherein the receiving means of the first and second support members further comprise slots in the first and second support members.

9. The secure stowage system of claim 1 further comprising the second support member releasably attached to the support system at both ends of the second support member.

10. The secure stowage system of claim 1 wherein the support system further comprises slotted rails.

11. The secure stowage system of claim 1 wherein the first and second mating means further comprise lugs.

12. The secure stowage system of claim 1 wherein the lockable item further comprises a bin.

13. The secure stowage system of claim 1 further comprising the second mating means being selectively retractable toward the lockable item, the second mating means being retractable only when the lock is in an unlocked position, and the second mating means being unretractable when the lock is in a locked position.

14. The secure stowage system of claim 1 further comprising the first and second support members having adjustable lengths.

15. The secure stowage system of claim 1 further comprising the lock having intermediate position in which a second adjustment may be made to the lockable item, but the first mating means still cannot be retracted.

16. A secure stowage system comprising:

a support system having rigid slotted rails, first and second support members, the first and second support members having rigid bars and receiving means, the receiving means having slots, the first support member releasably attached to the support system at both ends of the first support member, such that the first support member can only be removed from the support system by first moving the first support member toward the second support member, and the second support member releasably attached to the support system at both ends of the second support member, such that the second support member can only be removed from the support system by first moving the second support member toward the first support member, a lockable bin having a lid a lock and first and second mating means, the first and second mating means having lugs, the lugs of the first mating means adapted to engage the slots of the receiving means of one of the first and second support members, the lugs of the first mating means being selectively retractable toward the lockable bin, the lugs of the first mating means being retractable only when the lock is in an unlocked position, and the lugs of the first mating means being unretractable when the lock is in a locked position, the lugs of the second mating means adapted to engage the slots of the receiving means of the other of the first and second support members, and the lugs of the first and second mating means configured to engage the slots of the receiving means of the first and second support members when the lugs of the first and second mating means are in an extended position, the lockable bin configured to fit between the first and second support members such that when the lugs of the first and second mating means are in an extended position, the lockable bin cannot be removed from between the first and second support members without retracting the lugs of the first mating means;

the lock having an intermediate position in which the lid of the lockable bin may be opened, but the lugs of the first mating means still cannot be retracted, the first and second support members having horizontal elements such that the lockable bin can rest on the horizontal elements between the first and second support members when the lugs of the first mating means are retracted.

17. The secure stowage system of claim 16 further comprising the lugs of the second mating means being selectively retractable toward the lockable bin, the lugs of the second mating means being retractable only when the lock is in an unlocked position, and the lugs of the second mating means being unretractable when the lock is in a locked position.

18. The secure stowage system of claim 16 further comprising the first and second support members having adjustable lengths.

* * * * *